2,957,819
REFORMING PROCESS AND CATALYST THEREFOR

Vladimir Haensel, Hinsdale, Ill., assignor, by mesne assignments, to Universal Oil Products Company, Des Plaines, Ill., a corporation of Delaware No Drawing. Filed May 19, 1958, Ser. No. 735,935

4 Claims. (Cl. 208—136)

The present application is a continuation-in-part of my copending application, Serial No. 394,519, filed November 25, 1953, now abandoned. The present invention relates to the process of catalytically reforming hydrocarbons; it is specifically directed to the utilization of a novel catalytic composite comprising tungsten in processes for catalytically reforming hydrocarbons and mixtures of hydrocarbons boiling within the gasoline boiling range.

Recent developments in the petroleum industry have produced a catalyst which is capable of effecting the conversion of low-quality hydrocarbons, and mixtures of hydrocarbons, boiling within the gasoline boiling range, into a high-quality product possessing the required antiknock characteristics. This catalyst, comprising platinum, alumina and combined halogen, promotes desirable reforming-type reactions including, as principal reactions, the dehydrogenation of five and six-membered ring naphthenes into aromatic hydrocarbons, the dehydrocyclization of relatively short-chain paraffins directly to aromatics and, to a lesser extent, the isomerization of straight-chain, or slightly branched-chain, aliphatic hydrocarbons to a more highly branched-chain structure. These reactions combine to effect a substantial increase in the octane rating of the gasoline and naphtha fractions processed, and are especially suitable for the conversion of straight-run and natural gasolines, as well as cracked gasolines, and/or mixtures thereof.

The alumina-platinum-halogen (of the group consisting of chlorine and/or fluorine) catalyst has also been found to be of particular advantage in selectivity promoting the isomerization of substantially pure hydrocarbons such as butanes, pentanes, hexanes, and other hydrocarbons of relatively low molecular weight, at specific conditions of operation, or, to a somewhat lesser extent, the isomerization of these low-molecular weight hydrocarbons during the reforming operation.

In the present specification and appended claims, the phrase "within the gasoline boiling range" is designated to mean those hydrocarbons, and mixtures of hydrocarbons, having a mid-boiling point below about 425° F. (as determined by ASTM distillation method D86–52). This terminology is employed to distinguish a full boiling range gasoline, or any fraction thereof, from higher boiling materials such as kerosene fractions and light cycle oils, which have mid-boiling points above about 400° F., and in most instances above 425° F. For example, through the use of this terminology, a hydrocarbon fraction having a portion thereof boiling in excess of 425° F., but consisting of about 75% by volume hydrocarbons boiling below 425° F., is considered as a hydrocarbon mixture boiling "within the gasoline boiling range." The term, "combined halogen," employed in describing the composition of the catalytic composite, is designated to signify that such composite comprises a halogen, either chlorine and/or fluorine, in some combined form. The concentration of such halogen, however, is calculated as the elemental halogen, and not as it exists in its combined form. For example, although reference is made to a concentration of combined chloride in an amount of about 0.35% by weight, it is understood that the calculation of this concentration was based upon the quantity of elemental chlorine contained within the composite.

As hereinbefore set forth, three principal reactions exist, along with many subordinate reactions, in the reforming process. By an appropriate selection of operating conditions, which are dependent to a great extent upon the particular physical and chemical characteristics of the material being charged to the conversion process, such process being reforming, isomerization, or other specific conversion process, the alumina-platinum-combined halogen catalyst is capable of effecting an advantageous balance among the multitude of reactions effected through its use. Further, the degree to which the hydrocracking of long-chain paraffins into short-chain paraffins is effected is carefully controlled, both in quantity and quality. A significant, but relatively minor degree of hydrocracking is advantageous in producing a liquid product of higher volatility and of higher octane number. The hydrocracking reaction is also of advantage in converting those components, when present in the charging stock, which boil above the gasoline range, into components boiling within the gasoline boiling range and, therefore, further increases the volumetric yield of desired liquid product. The hydrocracking must not, however, be excessive to the extent that it results in the over-production of normally gaseous light paraffins which cannot be employed in the gasoline and, therefore, represents a substantial loss of liquid product. Also, excessive hydrocracking results in the increased deposition of coke and other carbonaceous material onto the catalyst, which deposition not only represents a loss of material which otherwise would go to gasoline, but also serves to de-activate the catalyst.

In the interest of simplicity, and for the purpose of illustration, the reforming process is conveniently represented by the following single chemical equation. It is not intended, however, that such illustration limit unduly the present invention to the particular reactions shown.

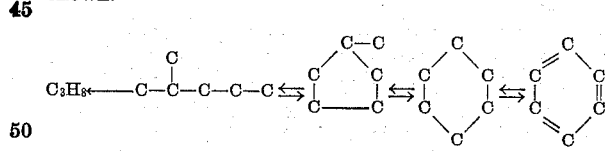

Illustrated are the hydrocracking of iso-hexane into propane and the cyclization of iso-hexane to methylcyclopentane, which in turn, is isomerized to cyclohexane, the latter being dehydrogenated to form benzene. It should be noted that all of the reactions are reversible with one exception, that of hydrocracking to form the light, gaseous paraffin. The rates of the individual reactions increase as the reactions are effected from left to right, the most rapid being the dehydrogenation of cyclohexane to benzene. In the conversion of the five-membered ring naphthenes into aromatic hydrocarbons, it is essential that the six-membered ring naphthene be removed from the system, through conversion to the aromatic hydrocarbon, as rapidly as possible. When the rate of such removal is caused to diminish, through excessive hydrocracking, and subsequent deactivation, the resulting pile-up of six-membered ring naphthenes causes the illustrated reactions to proceed to the left, resulting thereby in a further enhancement of hydrocracking.

The cyclization, dehydrogenation and dehydrocyclization reactions are primarily promoted by the platinum component of the catalytic composite. The degree, and kind, of hydrocracking is likewise carefully controlled through the utilization of combined halogen in particular quantities. The utilization of chlorine and/or fluorine imparts a certain acid-acting property to the catalytic composite, admittedly to promote limited, controlled hydrocracking, but, more importantly, to aid the platinum component in promoting cyclization, etc. Inherently, however, combined halogen, particularly chlorine, is continuously removed from the composite during processing, and eventually the desired acid-acting function is greatly diminished, the controlled degree and kind of hydrocracking is reduced, excessive hydrocracking results, producing large quantities of the light paraffins, particularly methane.

The object of the present invention is to supply the platinum-containing catalytic composite with a material possessing the ability to serve more effectively the acid-acting function, such material also possessing a sufficient degree of inherent tenaciousness to remain composited with the other catalytic components. In addition, the acid-acting component employed in the present invention is one which does not materially affect deleteriously the aromatization propensities of the catalytic composite.

In one embodiment, the present invention relates to a novel composition of matter which provides a catalytic composite comprising a refractory inorganic oxide, a noble metal and tungsten.

In a specific embodiment, the present invention provides a novel catalytic composite which comprises alumina, from about 0.01% to about 1.0% by weight of platinum and from about 0.01% to about 0.5% by weight of tungsten.

In another specific embodiment, the present invention relates to a novel catalytic composite comprising alumina, from about 0.01% to about 1.0% by weight of platinum, from about 0.01% to about 0.5% by weight of tungsten and from about 0.1% to about 8.0% by weight of combined halogen.

A more specific embodiment of the present invention provides an improvement in the process of catalytically reforming hydrocarbons, and mixtures of hydrocarbons, in the presence of a catalytic composite comprising alumina and platinum, which improvement comprises combining tungsten with said catalytic composite in an amount of from about 0.01% to about 0.50% by weight.

The refractory inorganic oxide employed as the carrier material in the present invention, represents a major proportion of the total catalyst composition. While any suitable refractory oxide may be employed, alumina is particularly suitable for use as the carrier material because the alumina appears to enter into a peculiar association, either chemical or physical, with the other components of the catalyst, and does not possess the tendency to affect detrimentally the desired catalytic functions thereof. Other suitable, but not necessarily equivalent, refractory inorganic oxides include the oxides of magnesium, silicon, titanium, zirconium, thorium, vanadium, etc., and mixtures of two or more.

The refractory oxide may be prepared in any suitable manner. For example, silica may be prepared by the acidification of water glass or other suitable alkali metal silicate solution. Oxides of other compounds may be prepared by reacting a basic reagent such as ammonium hydroxide, ammonium carbonate, etc. with an acid salt solution of the metal as, for example, the chloride, sulfate, nitrate, etc., or by aiding an acid to an alkali salt of the metal as, for example, commingling sulfuric acid with sodium aluminate, etc. Usually the oxide is washed and filtered, which may be accomplished in the same or separate steps, and may be effected in the presence of an acid or alkaline material. The oxide is dried, formed into particles of uniform, or irregular, size and shape by suitable methods such as grinding, pelleting, extrusion, etc., and then calcined. The other components then may be composited with the preformed particles of the oxide. The wet slurry of oxide, either with or without prior washing, may be composited with all or a portion of the remaining components, and then the composition may be dried, formed into particles and calcined. A suitable acid, either mineral or organic, may be commingled with the oxide in order to improve its properties, or, the oxide may be aged in air, water, acid or base, either at room temperature or at elevated temperature prior to compositing therewith either a portion, or all of the other components. Whatever method is employed, such method is not essential to the present invention, the feature of which is the incorporation of tungsten into the catalytic composite.

Platinum is composited with the catalyst, generally in an amount of from about 0.01% to about 1% by weight of the catalyst. The platinum may be commingled with the catalyst in any suitable manner and preferably is introduced thereto as an aqueous solution of chloro-platinic acid. Other suitable platinum solutions may be employed, and include colloidal solutions or suspensions of platinum cyanide, platinum hydroxide, platinum oxide, platinum sulfate, etc. In cases where these solutions are not soluble in water at the particular temperature employed, other suitable solvents such as alcohols, ethers, etc. may be utilized. The platinum appears to enter into a peculiar association with the other components of the catalyst, and serves to improve the antiknock characteristics of the reformate obtained in the process. While platinum is the preferred components, it is understood that other suitable metallic components may be employed either in conjunction with, or in the absence of a platinum component, although not necessarily with equivalent results. Such other components include nickel, cobalt, silver, gold, palladium, or the rare metals such as ruthenium, rhodium, osmium, iridium, etc., and mixtures of two or more of these metals. It is understood that although the metallic component is believed to exist within the composite in some combined form the metal, or mixtures of metals, may exist in the elemental state.

The final component of the catalytic composite is that which yields the acid-acting function; it is the essential feature of the present invention, and comprises tungsten. The addition of the tungsten to the other components of the catalytic composite may be accomplished in any suitable manner. In some instances, an oxide of tungsten may be separately prepared, as a slurry, and subsequently commingled with the wet composite hereinbefore described. A convenient means of compositing the tungsten with the other catalytic components, is through the utilization of an acid-salt solution, which is converted to the hydroxide through the action of a suitable alkaline material, and subsequently converted to an oxide via the application of elevted temperatures. Or, it is possible to form tungsten oxide through the utilization of a salt which decomposes to the oxide upon heating.

I have discovered that tungsten, when utilized as a component of the catalytic composite, imparts the necessary acid-acting function thereto, whereby the extent of hydrocracking is not effected beyond the desired degree. In reforming operations, the hydrocracking activity of the catalyst is of major import, and must be carefully controlled and selective so that excessive amounts of normally gaseous components do not result. The precise reason why the utilization of tungsten imparts this particular property to the catalyst, without impairing the aromatization and dehydrocyclization properties thereof, is not definitely known. It is believed, however that the tungsten exists within the composite as a tungsten oxide which has entered into some complex combination with the other components of the catalyst.

The tungsten is added to the catalytic composite in an amount of not more than about 0.5% by weight, and in an amount not less than about 0.01% by weight. As hereinafter set forth, it is preferred to employ an intermediate range of from about 0.03% to about 0.10% by weight. Although the tungsten component is referred to as tungsten oxide, the concentrations given refer to tungsten in the elemental state, and the calculations thereof are based thereupon. The order of combining the different components may be varied without removing the final catalytic composite from the broad scope of the present invention. It is generally preferred, however, to add the platinum component in the later stages of the manufacturing process in order to decrease further the opportunities for loss of this relatively expensive component.

As hereinbefore set forth, combined halogen is generally composited with the alumina-platinum composite for the purpose of imparting thereto certain desired physical and chemical characteristics. Such halogen is employed in an amount of from about 0.1% to about 8.0% by weight, and is computed on the basis of the elemental halogen, rather than as it exists in its combined form. The halogen employed is selected from the group consisting of chlorine, fluorine and mixtures of the same. Fluorine, when employed, is deposited in an amount from about 0.1% to about 5.0% by weight: chlorine is employed solely, or in conjunction with the fluorine, in amounts of from about 0.2% to about 8.0% by weight. Bromine and iodine are not often employed as components of the catalyst: of the halogen family, they are those which are most readily removed from the composite, either during the manufacturing process thereof, or within the very early stages of the reforming process, whereby the purpose for the utilization thereof is defeated.

As hereinbefore set forth, the refractory oxide, either with or without the other components, may be formed into particles. In another embodiment, the components of the catalyst may be composited together, and the complete mixture subsequently formed into particles. In either event, the mass is dried at a temperature of from about 200° F. to about 500° F. for a period of from about 2 to 24 hours or more prior to being formed into particles. Formation of particles of irregular size and shape may be accomplished by grinding, chopping, etc. and formation of uniform particles may be accomplished by pilling, extrusion, the oil-drop method, etc. After the particles are formed, they are calcined at a temperature of from about 500° F. to 1200° F. or more, for a period of 2 to 12 hours or more. In some cases, the particles comprising the refractory inorganic oxide carrier material and the tungsten oxide are calcined at a temperature of from about 800° F. to about 1200° F., and the final composite containing the platinum component is calcined at a temperature of from about 500° F. to about 1000° F. The calcination may be effected in the presence of air, a reducing atmosphere such as hydrogen, an inert atmosphere such as nitrogen, or mixtures thereof. In still another embodiment the catalyst may be first calcined in a reducing atmosphere and then calcined in an oxidizing atmosphere, or the reverse procedure may be used.

While the catalyst of the present invention is particularly suitable for the reforming of gasoline, it is understood that the catalyst may also find utility in other processes for the conversion of hydrocarbons such as the dehydrogenation of normally gaseous and normally liquid hydrocarbons, cyclization of aliphatic hydrocarbons containing six or more carbon atoms in a straight chain, isomerization reactions, and particularly the isomerization of olefinic, paraffinic, alkyl aromatic and naphthenic hydrocarbons, isomerization of acids, alcohols, ethers, etc., alkyl transfer reactions and hydrogen transfer reactions.

As hereinbefore set forth, these catalysts are particularly suitable for use in the reforming of hydrocarbons and/or fractions thereof boiling within the gasoline boiling range. The reforming operation may be effected at a temperature within the range of from about 600° F. to 1000° F. or more, a pressure within the range of from about 50 to 1000 pounds per square inch or more, and a liquid hourly space velocity (defined as the volumes of oil per hour per volume of catalyst within the reaction zone) of from about 2.0 to 20.0 or more. The reforming is effected preferably in the presence of hydrogen, and the hydrogen may be introduced from an extraneous source, or recycled from within the process. In a preferred operation, sufficient hydrogen will be produced in the reforming reaction to furnish the hydrogen required in the process, and, therefore, it is unnecessary to introduce hydrogen from an extraneous source.

The process of the present invention may be effected in any suitable equipment. A particularly suitable process comprises the well known fixed-bed system in which the catalyst is disposed in a reaction zone, and the hydrocarbons to be treated are passed therethrough in either upward or downward flow. The reaction zone effluent is generally fractionated to separate hydrogen and to recover the desired liquid products. As hereinbefore set forth, the hydrogen is recycled for further use in the process. Other suitable units in which the process may be effected include the fluidized-type process in which the hydrocarbons and catalyst are maintained in a state of turbulence, under hindered settling conditions, in a reaction zone; the fluidized-fixed bed type process wherein the catalyst is not withdrawn from the reaction zone as in the fluidized type process; the compact moving bed type in which the catalyst and hydrocarbons are passed either concurrently or countercurrently to each other, and the suspensoid type of operation in which the catalyst is carried into a reaction zone as a slurry in the hydrocarbon oil.

The following example is introduced to illustrate further the novelty and utility of the present invention, and the benefits to be derived through the utilization thereof. It is not intended to limit unduly the present invention to the specific conditions, reagents or concentrations employed therein.

EXAMPLE I

A series of catalytic composites comprising alumina, platinum and tungsten were prepared in the following manner. Alumina pellets, to be employed as the carrier material, were first prepared by commingling ammonium hydroxide with an aqueous solution of aluminum chloride, thereby forming aluminum hydroxide. The aluminum hydroxide was thoroughly washed with water, to remove various soluble impurities, and was subsequently dried and calcined. The calcined alumina was formed into pellets of uniform size and shape.

The calcined alumina pellets were impregnated with tungsten and platinum components by covering five 50-gram portions of pellets with 50 milliliters of an aqueous solution of ammonium tungstate. The concentration of the ammonium tungstate was such as to deposit the desired quantity of tungsten onto the alumina. The pellets were steeped in this solution for one hour, after which time the excess water was caused to evaporate, and the pellets calcined at 932° F. for a period of three hours.

The aluminum-tungsten oxide composites were subsequently soaked in an aqueous solution of chloro-platinic acid of sufficient concentration to deposit thereon 0.30% by weight of platinum, based upon the total weight of the final, calcined composite. As hereinbefore set forth, the excess water was removed through evaporation, and the resulting, substantially dry composite was calcined at a temperature of 932° F. for a period of three hours.

The five catalytic composites, designated as "A," "B," "C," "D" and "E," containing 0.78%, 0.10% 0.06%, 0.03% and 0.01% by weight of tungsten (all five catalysts contained 0.30% by weight of platinum), were individually utilized in the reforming of a Mid-Continent naphtha having the properties given in Table I.

Table I
PROPERTIES OF CHARGING STOCK

Gravity:
- ° API @ 60° F _____ 52.7
- Specific gravity @ 60° F _____ 0.7682

ASTM distillation, D86-52, ° F.:
- I.B.P _____ 229
- 5% _____ 247
- 10% _____ 254
- 30% _____ 283
- 50% _____ 311
- 70% _____ 340
- 90% _____ 364
- 95% _____ 373
- E.P _____ 387

Specific dispersion _____ 105.8
Aromatic concentration, volume percent ___ 8.8

The operating conditions were maintained at a temperature of 960° F., a pressure of 500 pounds per square inch, a hydrogen to hydrocarbon mol ratio of 1.8 and a liquid hourly space velocity of 11.85. The operation was effected over a period of 18 hours, with samples of the liquefied product being taken during the first and eighteenth hours. The samples from the first and eighteenth hours of each operation were analyzed for specific gravity and specific dispersion, and the aromatic concentrations were calculated therefrom. In addition, the various catalysts were analyzed for the quantity of carbon deposition; also, the total quantity of excess gaseous material (hydrogen and light, gaseous paraffins), removed from the unit during each operation, was carefully metered. The results were compared to those obtained utilizing a platinum-containing catalyst 0.30% by weight), which contained combined halogen in an amount of about 0.70% by weight, but which catalyst did not contain the tungsten component. The results are given in Table II; the reforming catalyst without tungsten designated as catalyst "F."

The advantages afforded the reforming of hydrocarbons, through the utilization of the catalyst of the present invention, are readily ascertained through reference to Table II.

Table II
EFFECT OF TUNGSTEN ON REFORMING CATALYST

| Catalyst Designation | A | B | C | D | E | F |
|---|---|---|---|---|---|---|
| Tungsten, wt. percent | 0.78 | 0.10 | 0.06 | 0.03 | 0.01 | ------ |
| Carbon Deposition, Wt. percent | 6.13 | 3.24 | 3.15 | 2.99 | 3.50 | 3.41 |
| Aromatics, vol. percent | | | | | | |
| 1st Hour | 46.9 | 51.5 | 52.5 | 52.0 | 51.8 | 50.9 |
| 18th Hour | 36.6 | 47.8 | 48.3 | 47.1 | 48.5 | 45.8 |
| Aromatic Differential | 10.3 | 3.7 | 4.2 | 4.9 | 3.3 | 5.0 |
| Total Gaseous Products, s.c.f./bbl | 22.40 | 29.05 | 30.03 | 28.37 | 27.32 | 29.08 |

The particular benefits of employing tungsten, within the range of 0.01% to about 0.50% are indicated through the comparisons of carbon deposition, aromatic differential and the total gaseous products. Also, there is defined the preferred range of 0.03% to about 0.10% by weight. Obviously, the quantity of tungsten employed in catalyst "A," 0.78% by weight, actually exerted a detrimental effect upon the most efficient balance of the various reforming reactions, hereinbefore described. This is evident from the excessive amount of carbon deposited on the catalyst and the rather rapid loss in aromatic production, which loss is further evidenced by the decrease in the quantity of gaseous products. These considerations effectively illustrate excessive hydrocracking with a resulting loss of dehydrogenation and dehydrocyclization activity.

Catalyst "E," containing the least amount of tungsten, in accordance with the present invention, indicates a slight improvement over the catalyst without the tungsten components, catalyst "F." Although a slight increase in carbon deposition was experienced, there was a significantly substantial decrease in the aromatic differential. That is, there was a lesser degree of loss of dehydrocyclization activity of catalyst "E" than was experienced with catalyst "F." Further, there was noted an effective decrease in the quantity of gaseous material produced which indicates an increase in the liquid yield resulting from particular control of the hydrocracking activity.

The foregoing example and specification clearly indicate the method of the present invention, whereby tungsten, in an amount of from about 0.01% to about 0.50% by weight, is composited with a platinum-containing catalyst, and further illustrates the benefits to be afforded through the utilization thereof.

I claim as my invention:

1. A catalytic composite which comprises a refractory inorganic oxide support from about 0.01% to about 1.0% by weight of platinum and from about 0.01% to about 0.5% by weight of tungsten.

2. A catalytic composite which comprises alumina, from about 0.01% to about 1.0% by weight of platinum, and from about 0.01% to about 0.5% by weight of tungsten.

3. In the process for catalytically reforming hydrocarbons and mixtures of hydrocarbons in the presence of a catalytic composite containing platinum composited with a refractory inorganic oxide, the improvement which comprises combining tungsten with said catalytic composite in a concentration within the range of from about 0.01% to about 0.5% by weight, based upon the weight of the total catalytic composite.

4. The improvement of claim 3 further characterized in that the tungsten concentration is within the range of from about 0.03% to about 0.10% by weight.

References Cited in the file of this patent

UNITED STATES PATENTS

| | | |
|---|---|---|
| 2,317,683 | Greensfelder | Apr. 27, 1943 |
| 2,717,230 | Murray et al. | Sept. 6, 1955 |
| 2,861,959 | Thorn et al. | Nov. 25, 1958 |